United States Patent [19]

Kral

[11] Patent Number: 4,870,340
[45] Date of Patent: Sep. 26, 1989

[54] METHOD OF AND APPARATUS FOR REDUCING ENERGY CONSUMPTION

[75] Inventor: Kevin D. Kral, Streamwood, Ill.

[73] Assignee: Davis Controls Corporation, Rolling Meadows, Ill.

[21] Appl. No.: 305,841

[22] Filed: Feb. 3, 1989

[51] Int. Cl.⁴ .............................................. G05F 1/44
[52] U.S. Cl. .................................... 323/235; 323/239; 323/319; 323/324
[58] Field of Search ................ 323/235, 239, 319, 324

[56] References Cited
U.S. PATENT DOCUMENTS 4,302,717 11/1981 Olla ...................................... 323/324
4,567,425 1/1986 Bloomer .............................. 323/235

Primary Examiner—Patrick R. Salce
Assistant Examiner—Jeffrey Sterrett
Attorney, Agent, or Firm—Robert J. Black

[57] ABSTRACT

The proposed invention is an energy saving load control device primarily intended for inductive loads (i.e., fluorescent lighting, motors, etc.) operating from an alternating current (AC) source. The proposed device switches the load voltage off at arbitrary positions in the sine wave and simultaneously provides a commutating path for any inductive current. By switching the load voltage on and off and providing a commutating current path reduced energy consumption is realized.

20 Claims, 3 Drawing Sheets

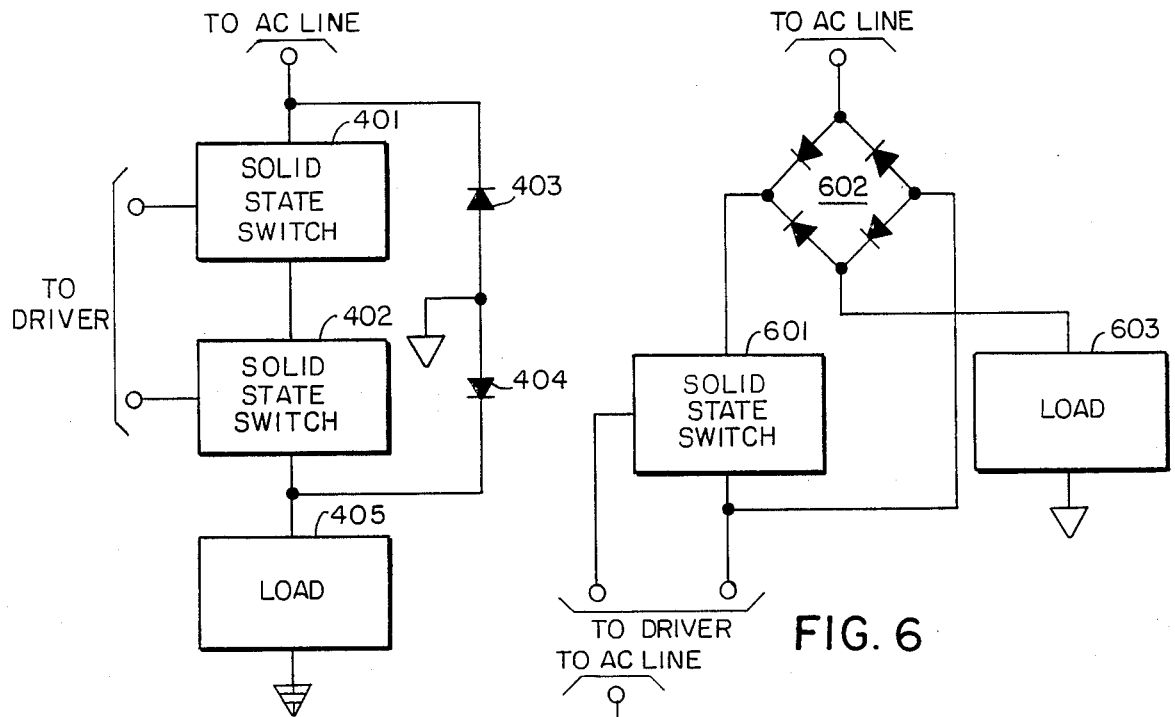
FIG. 4
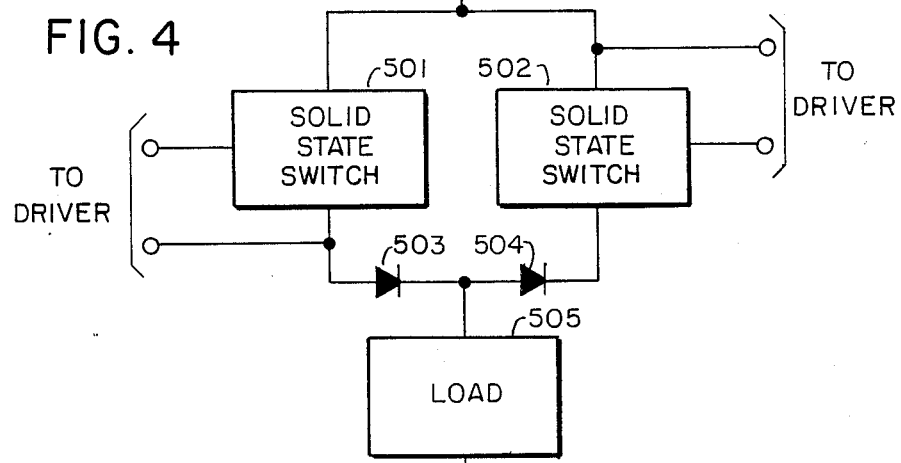
FIG. 6
FIG. 5
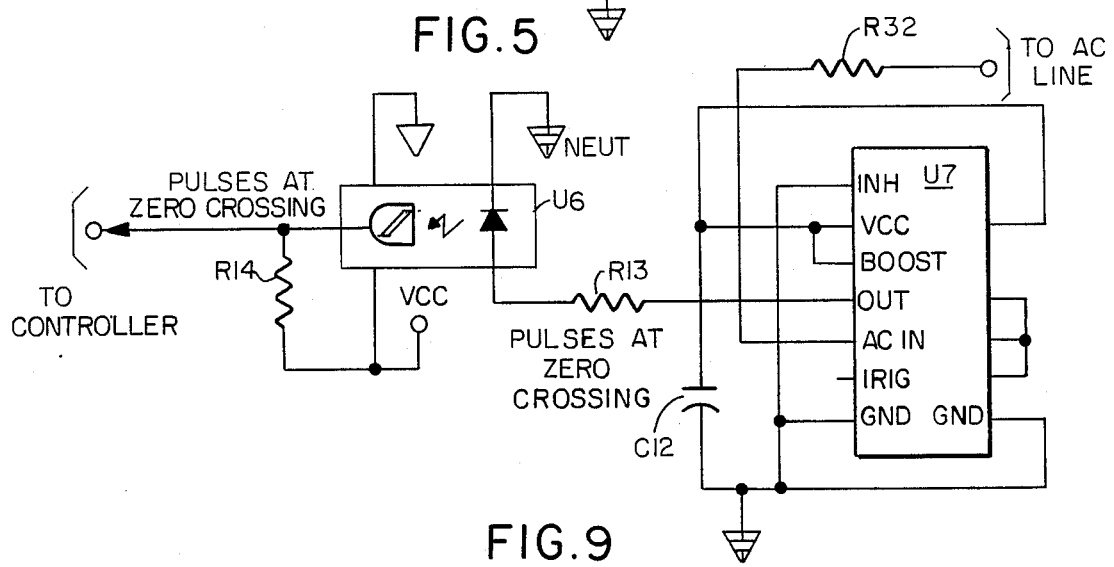
FIG. 9

METHOD OF AND APPARATUS FOR REDUCING ENERGY CONSUMPTION

BACKGROUND OF THE INVENTION

1. Field of the Invention

The proposed invention relates to reducing energy consumption of inductive loads. More particularly it is apparatus for and a method of reducing energy consumption of fluorescent and other ballasted inductive lighting loads such as high intensity discharge (HID) lamps without significantly reducing load voltage or light output and also for reducing energy consumption of inductive AC motors.

2. Background Art

Prior art implementations of energy saving devices for fluorescent lighting loads have generally not provided arbitrary load voltage switching or commutating current paths. Most of these devices employ a silicon controlled rectifier (SCR) in a conventional mode which prohibits arbitrary load voltage switching. When used in this mode the SCR acts as a switch to the downstream load. This switch can be turned on arbitrarily but can only be turned off when the load voltage reverses polarity. Resulting load voltage wave forms are as shown in prior art FIG. 1.

The disadvantage of the SCR load voltage wave form with the ballasted inductive load of fluorescent lighting is the relatively low RMS load voltage that results when the lighting load is controlled to obtain appreciable energy savings. Because the SCR switch can only be turned on after zero crossover the load voltage must remain off for relatively long periods within a half-cycle to realize appreciable power savings. The resulting low RMS load voltage in fluorescent lighting is undesirable from a bulb life standpoint and to insure adequate firing of the fluorescent bulbs from a cold start. Indeed most SCR fluorescent lighting devices cannot restart fluorescent lights if they are switched off without first applying full power and returning to the switched wave form mode. This is a distinct disadvantage for a multiple switched fluorescent load.

The proposed invention overcomes many of these disadvantages by switching only a small portion of the wave form to achieve appreciable energy savings. The result is load voltage with a relatively high RMS value at appreciable power savings.

SUMMARY OF THE INVENTION

The proposed invention consists of four basic parts. These are: a load switch, a commutating switch, a switch driver and a controller.

The load switch supplies power to the inductive load and can be switched on or off independent of line voltage by a control signal from the switch driver.

The commutating switch is similar to the load switch and can be turned on and off arbitrarily by a command from the switch driver. The commutating switch is used as a shorting switch across the load to provide a path for the current resulting from the stored energy in the collapsing magnetic field of the inductive load when the load switch is opened.

The switch driver provides the necessary drive signals to both the load and commutating switches when commanded by the controller. The switch driver ensures that the commutating switch and the load switch are not on at the same time but are switched in conjunction with each other. That is when the load switch is open the commutating switch is closed and when the load switch is closed the commutating switch is open.

The controller monitors the line voltage and issues on/off commands to the switch driver circuitry. These commands are synchronized to the zero crossings of the line voltage and occur at predetermined time delays and durations. Zero crossing synchronization ensures that equal portions of the sine wave are removed in both positive and negative half cycles so that DC components are not present. The predetermined time delays and durations are based on empirical data from actual fluorescent loads. Based on tests conducted a dual chopped wave form provides significant power reduction with minimal light loss and load voltage drop. With this wave form applied to a fluorescent load the RMS load voltage remains high enough at a significant power savings to reignite the lamps when switched on.

BRIEF DESCRIPTION OF THE DRAWINGS

FIG. 4 is a simplified block diagram of a switching circuit for use in the present invention.

FIG. 5 is a simplified block diagram of another switching circuit usable in the present invention.

FIG. 6 is yet another switching circuit usable in the present invention.

FIG. 9 is a schematic diagram of a zero crossing detection circuit in accordance with the present invention.

DESCRIPTION OF THE PREFERRED EMBODIMENT

Figure 1:
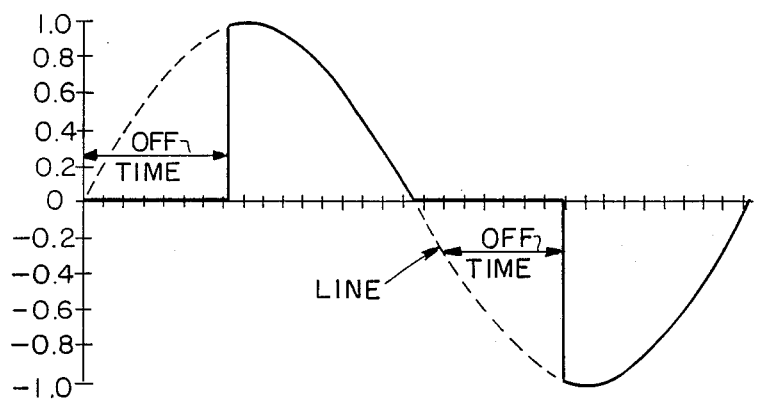
FIG. 1 is a wave form of a prior art load control device output.
Figure 2:
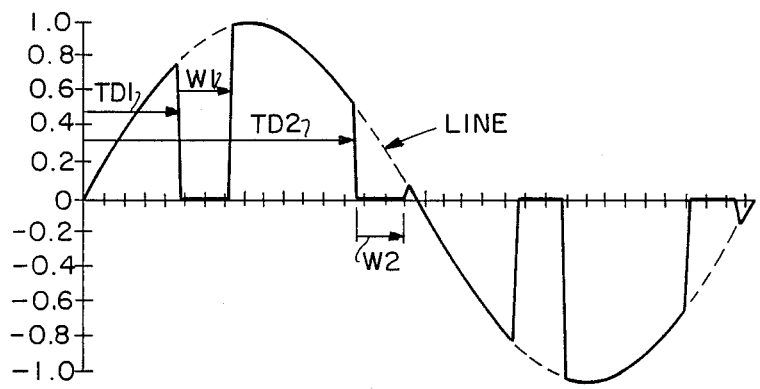
FIG. 2 is a wave form of the output of a load control device in accordance with the present invention.
Figure 3:
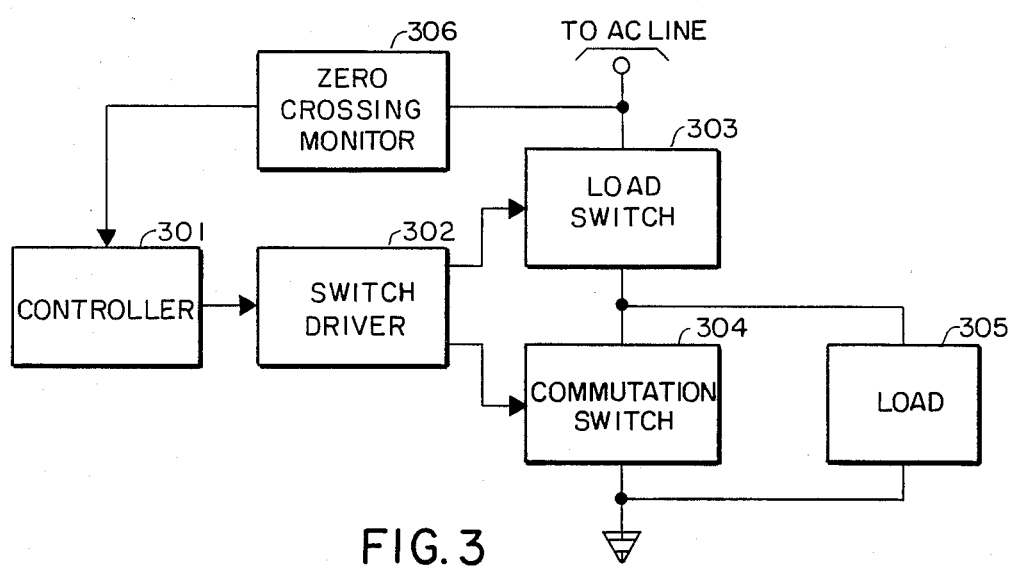
FIG. 3 is a simplified block diagram of a load control device in accordance with the present invention.

Referring first to the wave form of FIG. 2 and the block diagram of FIG. 3. The switches and drive circuitry of the present load control device can turn on and off independent of line voltage unlike conventional SCR based devices, thus other switching times, delays and load voltage wave forms are possible. The dual chopped wave form of FIG. 2 is not intended to be the only energy saving implementation. Because a commutating current path is provided in the implementation the load current continues to flow after the load switch 303 is opened due to the energy storing properties of the inductive load 305. This continuation of load current aids in maintaining the light output of the fluorescent lights and is an integral part of the invention.

Implementation of the load and commutating switches 303 and 304 shown in FIG. 3 can be identical. Their function is to act as a switch, based on command inputs, which can be opened and closed independent of the line voltage they are switching. The load switch 303 must be capable of conducting full load current and be capable of withstanding peak line voltage. The commutating switch 304 must be capable of withstanding peak line voltage but can be designed for lesser current loads since it only conducts during the off times of the load switch.

A variety of solid state switching devices can be used to implement the load and commutating switches and include Gate-Turn-Off Thyristors (GTOs), Insulated-Gate Bipolar Transistors (IGBTs), Metal Oxide Substrate Field Effect Transistors (MOSFETs) and Bipolar Transistors. Each of these devices are unipolar and can only conduct in one direction. As a result two devices are required for AC switching with reverse conducting or blocking diodes as shown in FIGS. 4 and 5.

One alternative configuration using only one solid state switching device is shown in FIG. 6. This configuration includes a diode bridge 602 and conducts current through the solid state switch 601 in the same direction for both positive and negative half-cycles but has the distinct disadvantage of introducing an additional diode drop over the configurations of FIGS. 4 and 5 as noted above. The additional diode drop can result in significant power losses at large load currents and is therefore an undesirable configuration for the load switch. However, because the commutating switch conducts less current, the additional diode losses may be of little consequence and the cost savings of eliminating one active solid state switching device may be more prudent for the commutating switch configuration. However, for purposes of discussion the same configuration is assumed for both the load and commutating switch implementations.

From a power loss standpoint the implementations of FIGS. 4 and 5 are equivalent but the implementation of FIG. 4 is more desirable because the drive signal has the same reference ground for both the positive and negative half-cycle conducting elements. As a result this configuration is considered the best for the final implementation.

Figure 7:
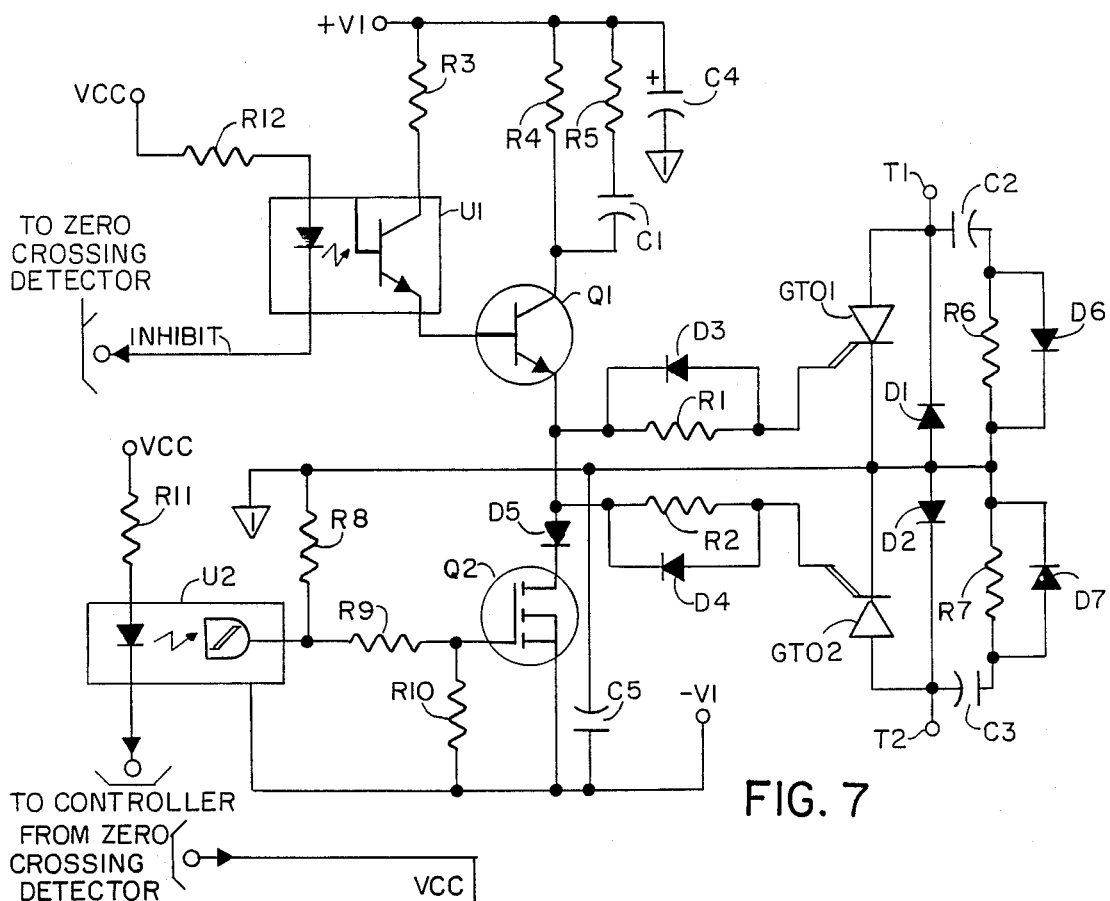
FIG. 7 is a schematic diagram of a load and commutating switch for use in the present invention.

Of the solid state switching devices readily available the Gate-Turn-Off thyristor or GTO was selected as the best device to use because of its ruggedness and cost over the other devices mentioned. Implementation of the load and commutating switch is shown in the detailed schematic of FIG. 7.

For the load switch input power is applied at Terminal T1 and Terminal T2 is connected to the load which is referenced to line neutral. Assuming GTO 1 and GTO 2 are "on" and in the conducting state during the positive half-cycle, current flows into Terminal T1 through GTO 1, diode D2 and out Terminal T2 through the load to neutral. During the negative half-cycle current flows from line neutral through the load into Terminal T2, through GTO 2 and diode D1 and out Terminal T1 to line high. If both GTO 1 and 2 are in the blocking or "off" state then no current can flow through the load. GTO 1 is considered the positive half-cycle conducting element and diode D1 is considered its reverse conducting diode. GTO 2 is considered the negative half-cycle conducting element with diode D2 its reverse conducting diode.

Both GTO 1 and 2 are in the conducting or "on" state when a small current (less than 300 mA) flows into their gate terminals through resistors R1 and R2, respectively. With FET Q2 in the "off" state transistor Q1 is biased on through resistor R3 and the necessary drive current flows through Q1, resistors R4 and R5 into the GTO gate terminals. Resistor R4 is used to limit the GTO gate current and resistor R5 and capacitor C1 are used to provide a "speedup" or current pulse to aid in GTO turn on. When capacitor C1 charges the GTO gate current is limited by resistors R4, R1 and R2. Resistors R1 and R2 are used to prevent one GTO from clamping the other GTO and preventing proper turn on.

Also included in the turn on circuitry is opto-isolator U1. This device is included for an external inhibit signal. Unless the light emitting diode (LED) of opto-isolator U1 is in the "on" state transistor Q1 cannot be biased on and the GTOs cannot be turned on. This is included as a safety interlock for the control circuitry which provides power to the opto-isolator LED of U1.

GTO turnoff is initiated by reverse biasing the gate terminals with respect to the GTO cathode. This is accomplished by putting FET Q2 into the "on" state. When Q2 is on, charge is depleted from the GTO gate terminals as a current pulse through diodes D3, D4, D5, and FET Q2 to the −V1 terminal. When FET Q2 is in the conducting or "on" state the base of Q1 is pulled below the emitter voltage insuring that Q1 is turned off.

Transistor Q2 is turned "on" when a positive voltage is applied to the gate-source junction of Q2. This voltage is applied when the LED of opto-isolator U2 is in the off state causing the open collector output of opto-isolator U2 into a "high" state.

When the LED of opto-isolator U2 is turned on, the open collector output of opto-isolator U2 is held low causing FET Q2 to turn off which in turn causes Q1 to begin conduction turning on the GTOs. Thus when the LED of opto-isolator U2 is "on" the GTO switches are "off" and when the LED is "off" the GTOs are held in the "on" state. Therefore on/off control of the switch is provided by turning the LED of U2 off and on.

To protect the GTOs from switching transients snubber circuits are placed across the GTO anodes and cathodes. These snubber circuits absorb switching transient energy and are realized by the resistor-diode-capacitor combinations shown by resistor R6, diode D6, and capacitor C2 and by resistor R7, diode D7, and capacitor C3 in FIG. 7.

An identical circuit is implemented for the commutating switch with Terminal T1 connected to the load high side (Terminal T2 of load switch) and Terminal T2 referenced to line neutral. In this configuration the load and commutating switches cannot be turned "on" at the same time or a "short" cross the line will occur. This turn "on" and turn "off" sequencing of the load and commutating switches are controlled by the switch driver circuitry. The only other difference between the load and commutating switches are the power supplies providing plus and minus voltages for the gate drive. Because the load switch operates near the line supply voltage and the commutating switch operates near line neutral separate isolated plus and minus supplies are required for these switches.

Figure 8:
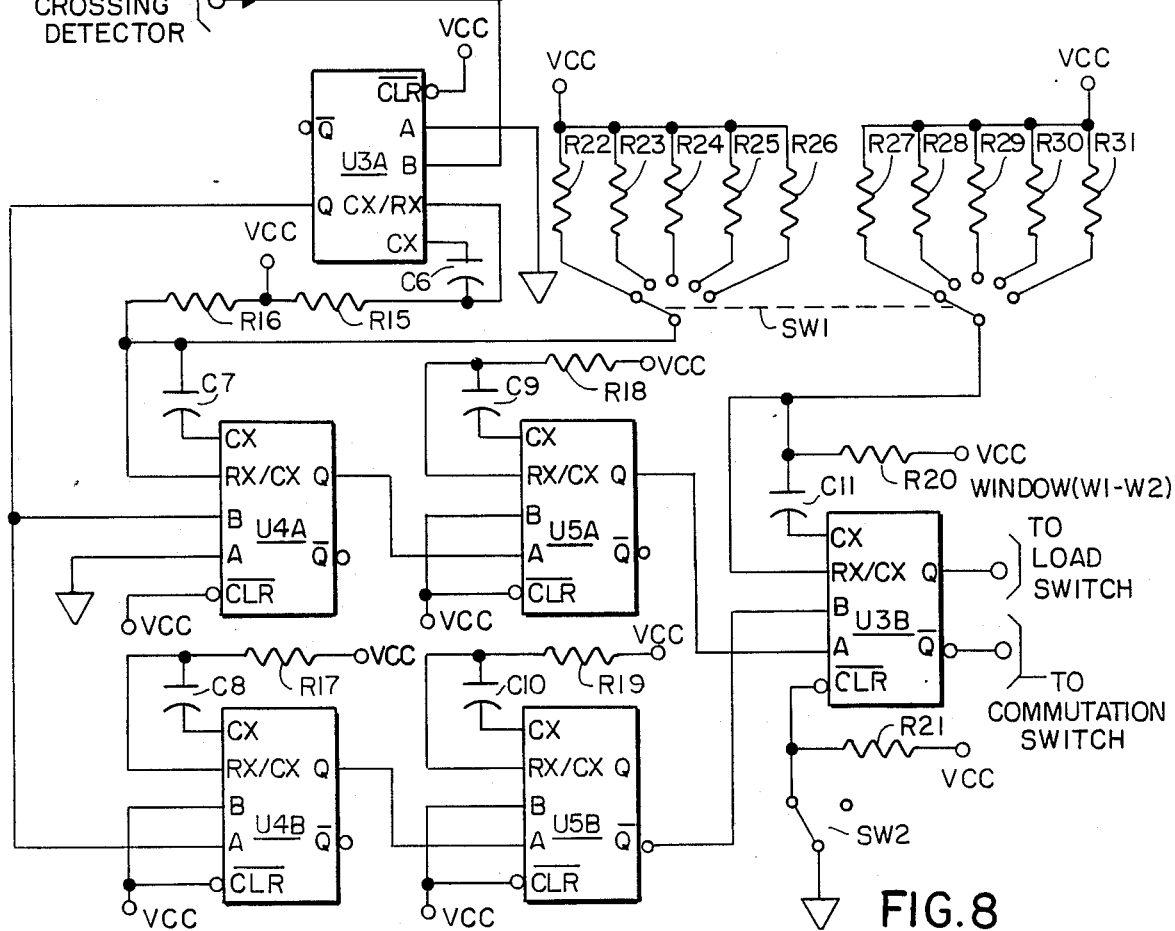
FIG. 8 is a schematic diagram of controller and driver circuitry for use in the present invention.

The function of the switch driver circuitry of FIG. 8 is to insure that the load and commutating switches are not commanded on at the same time. This is easily accomplished by employing the Q and $\overline{Q}$ outputs of standard TTL logic devices. These outputs are in opposite states of each other and for the switching speeds of the GTOs and opto-isolators employed, are adequate for the switch drive circuitry.

The device employed to interface with the opto-isolators of the load and commutating switches in a practical embodiment of the invention was a 74LS221 integrated circuit. This device is a dual monostable multivibrator with Q and $\overline{Q}$ outputs which was included as part of the control circuitry in establishing the window lengths of the chops for the controller (see U3B FIG. 8). While this device was used, any TTL type device with the Q and $\overline{Q}$ outputs could be used as the interface between the controller of FIG. 8 and opto-isolators U2 of the load and commutating switches.

The controller also shown in FIG. 8 establishes the necessary timing and on/off commands through the switch driver circuitry to the load and commutating switches to realize the desired energy savings for an inductive load such as fluorescent lighting. Through empirical data specific on/off commands, time delays and durations were determined for a fluorescent lighting load and implemented using simple monostable multivibrator implementations.

Table 1 shows the specific empirical data recorded on a bank of fluorescent lights. This Table gives the measured power reduction, light reduction, and load voltage reduction for specific on/off windows to the load. The wave form generated to the load is the same as that shown in FIG. 2 for various time delays TD1 and TD2 and window durations W1 and W2. At all power savings levels given in Table 1 the RMS load voltage remained within the 16% of line voltage which enables the lamps to reignite in an energy savings mode.

FIG. 8 shows the circuit implementation of the multivibrators U3A, U4A, U4B, U5A and U5B to realize the specific time delays and durations to obtain the results given in Table 1. All timing is referenced to the zero crossing of the line voltage and equal "chops" are taken out of both positive and negative half-cycles. This ensures that DC components are not present to shorten fluorescent bulb life. The circuitry of FIG. 9 was implemented to monitor the line voltage for zero crossings and provides the necessary pulses for synchronization. The specific device used to generate pulses at zero crossings of the line voltage is a CA3059 integrated circuit. This is a specific chip manufactured for this purpose and is normally used to trigger a triac thyristor. In this implementation the output pulses are used to trigger the LED of an opto-isolator U6 for use by the controller circuitry. While this circuit implementation was used, many other zero crossing techniques could be implemented to achieve the same line synchronization pulses.

The zero crossing pulses from the opto-isolator U6 of FIG. 9 are input to a monostable multivibrator of fixed pulse duration (U3A) of FIG. 8. The output pulses from this multivibrator are used to trigger two other multivibrators U4A and U4B which establish time delay 1 (TD1) and time delay 2 (TD2) as implemented by U4A and U4B respectively. As shown in Table 1, TD1 varies for different power savings and these various delays can be selected by switching different resistor values at switch 1 (SW1). The outputs of the time delay mutivibrators are input to two fixed duration multivibrators (U5A and U5B) which generate short pulses at the end of the two time delays to trigger the final output multivibrator (U3B) which establishes the window durations (W1=W2). Only one multivibrator is needed since window 1 equals window 2 as given in Table 1. As mentioned previously the Q and $\overline{Q}$ outputs of multivibrator U3B are used as the switch driver interface which turns the load and commutating switches on and off. The duration of the windows are selected in conjunction with time delay 1 (TD1) to obtain the results given in Table 1. The double pole multi-throw switch SW-1 provides the appropriate timing resistor for the specified time delays and windows.

The implementation of the controller shown in FIG. 8 is not intended to be the only configuration that can be used, indeed many configurations can be envisioned which provide the appropriate time delays and windows such as microprocessors and PROM look-up tables. The controller's function is simply to provide the appropriate on/off commands to achieve the desired results at the load. In fact the results, time delays and window durations given in Table 1 are not intended to be the only useful configuration of the invention other time delays and windows are anticipated for other loads such as AC motors and High Intensity Discharge lighting.

The jist of the invention is a device that can be programmed to switch an AC load on and off to achieve the desired energy saving results while providing a commutating current path for stored energy in inductive loads.

While only certain embodiments of the present invention have been disclosed, it will be obvious to those skilled in the art that numerous modifications can be made without departing from the spirit of the present invention, which shall be limited only by the scope of the claims appended hereto.

What is claimed is:

1. A control device for an inductive load comprising:
   a normally operated load switch connected between a source of alternating current and an inductive load;
   a normally inoperative commutating switch connected across said load;
   a controller circuit;
   a monitor circuit connected between said alternating current source and said controller, operated in response to a zero crossing of said alternating current from a positive half-cycle to a negative half-cycle, or in the alternative, from a negative half-cycle to a positive half-cycle to initiate sequential operation of said controller;
   said operated controller after a first predetermined period of time rendering said load switch inoperative and rendering said commutating switch operated.

2. A control device for an inductive load as claimed in claim 1 wherein:
   said controller is further operated after a second predetermined period of time to render said commutating switch inoperative and render said load switch operated.

3. A control device for an inductive load as claimed in claim 2 wherein:
   said controller is further operated after a third predetermined period of time to render said load switch inoperative and render said commutating switch operated.

4. A control device for an inductive load as claimed in claim 3 wherein:
   said controller is yet further operated after a fourth period of time to render said commutating switch inoperative and render said load switch operated.

5. A control device for an inductive load as claimed in claim 1 wherein:
   there is further included a driver circuit connected between said controller and said load switch.

6. A control device for an inductive load as claimed in claim 5 wherein:
   said driver circuit comprises a first portion of a dual monostable multivibrator.

7. A control device for an inductive load as claimed in claim 1 wherein:

said load switch includes first and second solid state switches.

8. A control device for an inductive load as claimed in claim 7 wherein:
there is further included a different forward blocking diode in series with each of said solid state switches.

9. A control device for an inductive laod as claimed in claim 7 wherein:
said first and second solid state switches are unipolar in characteristic and each is conductive in a single direction only.

10. A control device for an inductive load as claimed in claim 1 wherein:
there is further included a driver circuit connected between said controller and said commutating switch.

11. A control device for an inductive load as claimed in claim 10 wherein:
said driver circuit comprises a second section of a dual monostable multivibrator.

12. A control device for an inductive load as claimed in claim 1 wherein:
said controller comprises a plurality of multivibrators.

13. A control device for an inductive load as claimed in claim 1 wherein:
said load switch comprises a single solid state switch and a diode bridge circuit connected between said switch and said load.

14. A control device for an inductive load as claimed in claim 1 wherein:
said monitor comprises a zero crossing detector circuit operated in response to each crossing of said alternating current from a positive half-cycle to a negative half-cycle, or in the alternative, from a negative half-cycle to a positive half-cycle to generate a pulse for transmission to said controller whereby said sequence of operations of said controller is initiated.

15. The method of periodically interrupting each cycle of an alternating current voltage to control the amount of current flowing through an inductive load, comprising the steps of:
monitoring said alternating current voltage for a zero crossing of said voltage from a positive half-cycle to a negative half-cycle, or in the alternative for a zero crossing, from a negative half-cycle to a positive half-cycle;
in response to each zero crossing, controlling a load switch after a first predetermined period of time to interrupt conduction of said voltage to said load and to operate an associated commutating switch to place a short circuit across said load;
after a second predetermined period of time, controlling said load switch to conduct said voltage to said inductive load and render said commutating switch inoperative;
after a third predetermined period of time, controlling said load switch to again interrupt said voltage conducted to said load and control said commutating switch to again place a short circuit across that load;
after a fourth predetermined period of time, controlling said load switch to again conduct said voltage to said load and render said commutating switch inoperative;
and repeating each of the preceding steps in the given sequence for each zero crossing of said current from a positive half-cycle to a negative half-cycle or in the alternative for each zero crossing of said current from a negative half-cycle to a positive half-cycle.

16. The method as claimed in claim 15 wherein there is further included the step of rendering a controller initially operated in response to each zero crossing of said voltage from a positive half-cycle to a negative half-cycle, or in the alternative from each negative half-cycle to each positive half-cycle.

17. The method as claimed in claim 16 wherein:
in response to a first sequential operation of said controller a driver circuit is operated to render said load switch inoperative and said commutating switch operated.

18. The method as claimed in claim 17 wherein:
in response to a second sequential operation of said controller said driver circuit is operated to render said load switch operated and said commutating switch inoperative.

19. The method as claimed in claim 18 wherein:
in response to a third sequential operation of said controller said driver circuit is operated to render said load switch inoperative and said commutating switch operated.

20. The method as claimed in claim 19 wherein:
in response to a fourth sequential operation of said controller said driver is operated to render said load switch operated and said commutating switch inoperative.

* * * * *